US007587799B2

(12) United States Patent
Li

(10) Patent No.: US 7,587,799 B2
(45) Date of Patent: Sep. 15, 2009

(54) INSTALLATION TOOL FOR HELICAL COIL INSERTS

(76) Inventor: Yu Hsin Li, No. 5, Avenue 15, Lane 555, Sec. 1, Jonsan Road, Changhua 50063 (TW)

( * ) Notice: Subject to any disclaimer, the term of this patent is extended or adjusted under 35 U.S.C. 154(b) by 2 days.

(21) Appl. No.: 12/002,859

(22) Filed: Dec. 19, 2007

(65) Prior Publication Data

US 2009/0158568 A1 Jun. 25, 2009

(51) Int. Cl.
*B23P 19/04* (2006.01)

(52) U.S. Cl. .................................................... 29/240.5

(58) Field of Classification Search ................ 29/240.5, 29/227, 225, 263, 270, 280

See application file for complete search history.

(56) References Cited

U.S. PATENT DOCUMENTS 2,390,545 A * 12/1945 Lang ......................... 29/240.5
2,521,825 A * 9/1950 Brown ......................... 33/831
2,584,118 A * 2/1952 Forster ....................... 29/240.5
2,878,542 A * 3/1959 Mill et al. ................... 411/555
3,019,517 A * 2/1962 Lovecky .................. 242/439.1
4,216,585 A * 8/1980 Hatter ......................... 33/836
4,768,270 A * 9/1988 Czarnowski ............... 29/240.5
4,980,959 A * 1/1991 Czarnowski ............... 29/240.5
5,113,561 A * 5/1992 Scott ........................... 29/228
5,212,865 A * 5/1993 Davis et al. ................ 29/240.5
6,421,899 B1 * 7/2002 Zitnay ....................... 29/240.5
7,036,405 B2 * 5/2006 Trank et al. ................... 81/460

* cited by examiner

*Primary Examiner*—Lee D Wilson
(74) *Attorney, Agent, or Firm*—Charles E. Baxley

(57) ABSTRACT

An installation tool includes two or more helical coil inserts having different outer diameters and each having a central extension, two or more driving shanks each having a compartment formed by a peripheral wall and each having one or more notches for engaging with the central extension of either helical coil insert and for installing the helical coil inserts into a hole of a work piece, and a handle or a driving mandrel may be used for rotating the driving shanks to install either of the helical coil inserts into the hole of the work piece. Two or more guiding members may be changeably attached to an outer sleeve for engaging with the driving shanks or the helical coil inserts.

4 Claims, 4 Drawing Sheets

INSTALLATION TOOL FOR HELICAL COIL INSERTS

BACKGROUND OF THE INVENTION

1. Field of the Invention

The present invention relates to an installation tool, and more particularly to an installation tool including a number of driving shanks selectively or changeably attached to a driving mandrel for changeably engaging with different helical coil inserts having different outer or inner diameters and for installing the different helical coil inserts in the tapped holes or screw holes formed in the work piece.

2. Description of the Prior Art

Typically, the screw holes formed in the work pieces are provided for engaging with screws or bolts or the other fasteners, and will be broken or damaged after use, such that the screws or bolts or the other fasteners may not be suitably engaged with the screw holes of the work pieces.

A helical coil insert has been developed and provided for engaging into the tapped holes or the damaged screw holes of the work piece for threading or engaging with the other screws or bolts or the other fasteners.

An installation tool has also been developed and provided for engaging with the helical coil inserts and for forcing and installing the helical coil inserts into the tapped holes or the damaged screw holes of the work pieces.

For example, U.S. Pat. No. 4,768,270 to Czarnowski, and U.S. Pat. No. 4,980,959 to Czarnowski disclose two of the typical installation tools each comprising an elongate threaded mandrel for engaging with the helical coil inserts and for forcing and installing the helical coil inserts into the tapped holes or the damaged screw holes of the work pieces.

However, the elongate threaded mandrel includes a predetermined outer diameter that may only be used for engaging with a helical coil insert also having the predetermined inner diameter, but may not be used for engaging with the other helical coil inserts, such that the user has to spend a lot of money to purchase a number of different installation tools having different driving shanks for engaging with different helical coil inserts having different outer or inner diameters.

The present invention has arisen to mitigate and/or obviate the afore-described disadvantages of the conventional installation tools for installing the helical coil inserts.

SUMMARY OF THE INVENTION

The primary objective of the present invention is to provide an installation tool including a number of driving shanks selectively or changeably attached to a driving mandrel for changeably engaging with different helical coil inserts having different outer or inner diameters and for installing the different helical coil inserts in the tapped holes or screw holes formed in the work piece.

In accordance with one aspect of the invention, there is provided an installation tool comprising a first helical coil insert including a central extension, at least one second helical coil insert including a central extension and including an outer diameter different from that of the first helical coil insert, a first driving shank including a compartment formed in a first end portion thereof and formed by a peripheral wall, and including at least one notch formed in the peripheral wall for engaging with the central extension of either of the first and the second helical coil inserts and for installing either of the first and the second helical coil inserts into a hole of a work piece, at least one second driving shank including a compartment formed in a first end portion of the second driving shank and formed by a peripheral wall, and including at least one notch formed in the peripheral wall of the second driving shank for engaging with the central extension of either of the first and the second helical coil inserts and for installing either of the first and the second helical coil inserts into the hole of the work piece, and a rotating device for rotating the first and the second driving shanks to install either of the first and the second helical coil inserts into the hole of the work piece.

The rotating device includes a driving mandrel having a non-circular engaging hole formed in a first end portion thereof, and the first and the second driving shanks each include a non-circular segment provided on a second end portion thereof for engaging with the non-circular engaging hole of the driving mandrel and for allowing the first and the second driving shanks and the first and the second helical coil inserts to be changeably rotated by the driving mandrel.

The driving mandrel includes a handle coupled to the driving mandrel for rotating the driving mandrel. An outer sleeve may further be provided and rotatably engaged with the driving mandrel and provided for being held by a user for allowing the driving mandrel to be rotated relative to the outer sleeve.

A first guiding member and at least one second guiding member may further be provided and changeably attached to the outer sleeve and each include a bore formed therein for slidably and rotatably receiving either of the first and the second driving shanks.

The outer sleeve includes an inner thread formed therein, and the first and the second guiding members each include an outer thread formed thereon for engaging with the inner thread of the outer sleeve and for detachably attaching either of the first and the second guiding members to the outer sleeve.

The first and the second guiding members each include an enlarged opening formed therein for forming a peripheral shoulder between the bore and the enlarged opening thereof and for engaging with the first and the second helical coil inserts to the first and the second guiding members.

The first and the second guiding members each include at least one spring-biased projection attached thereto. For example, the first and the second guiding members each include a screw hole formed therein for engaging with a fastener, and the spring-biased projection is attached to the fastener.

The driving mandrel may further include a graduation provided on an outer peripheral portion thereof for indicating a relative movement between the outer sleeve and the driving mandrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
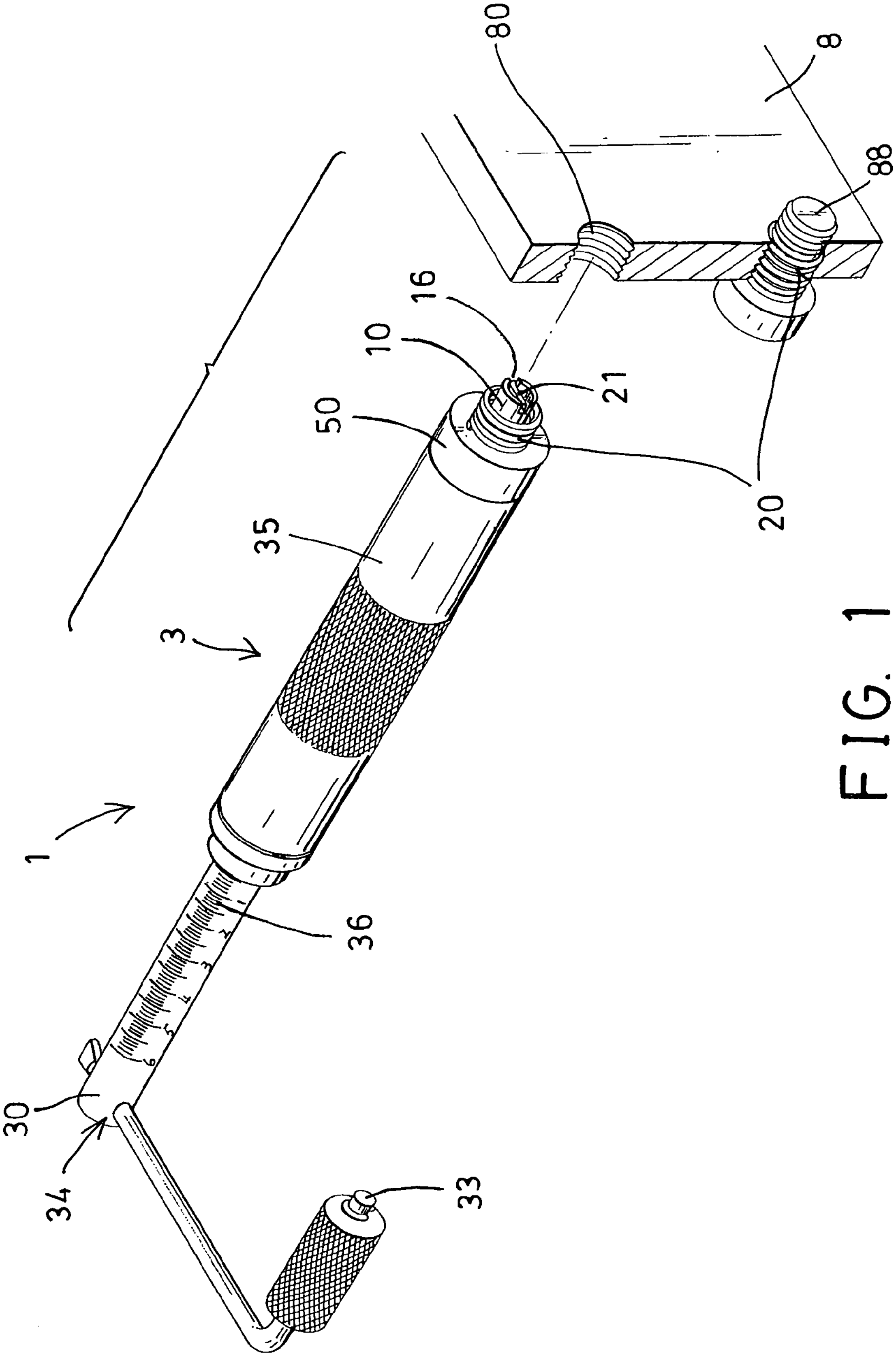
FIG. 1 is a partial exploded view illustrating the operation of an installation tool in accordance with the present invention.
Figure 2:
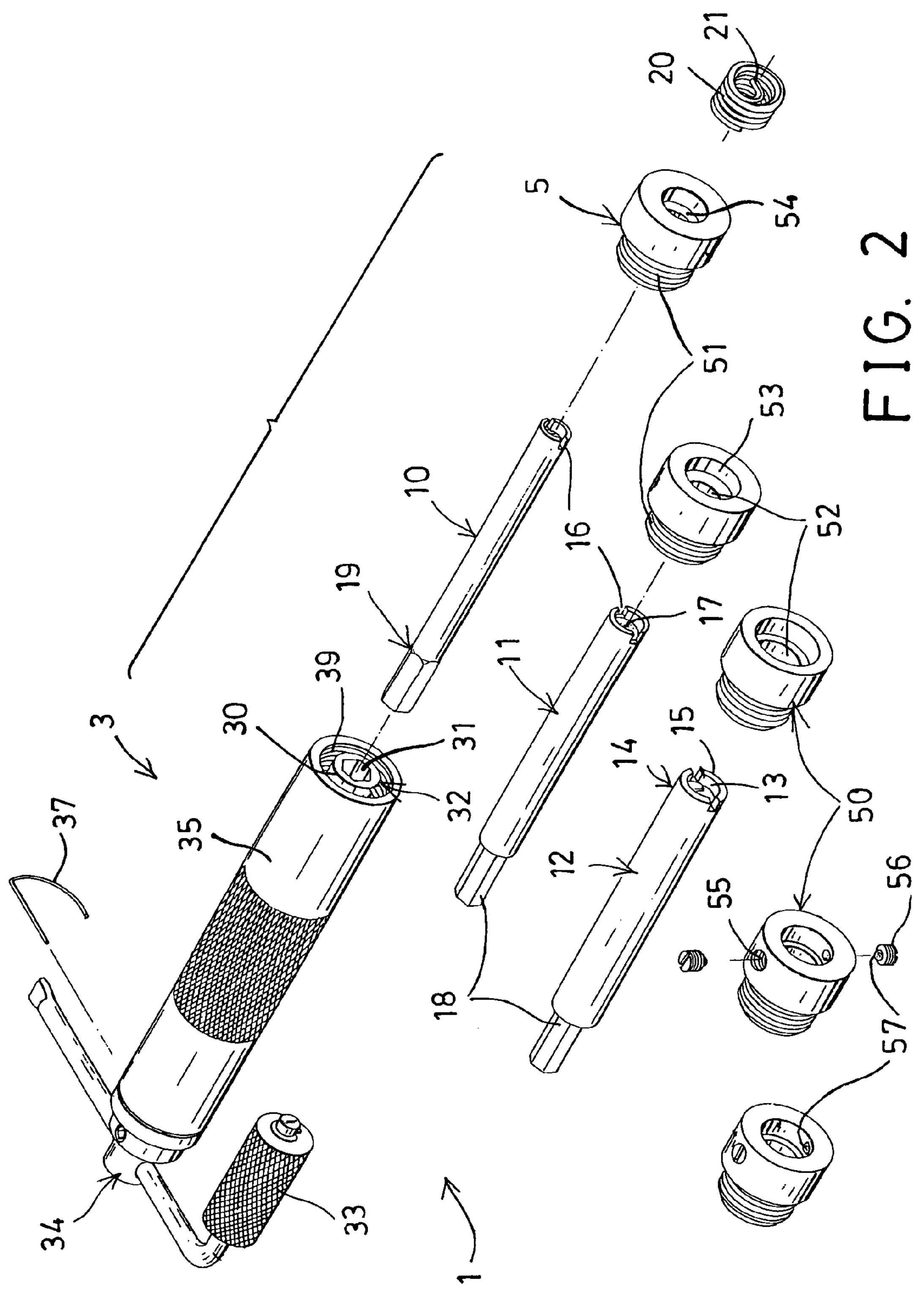
FIG. 2 is another partial exploded view of the installation tool.
Figure 3:
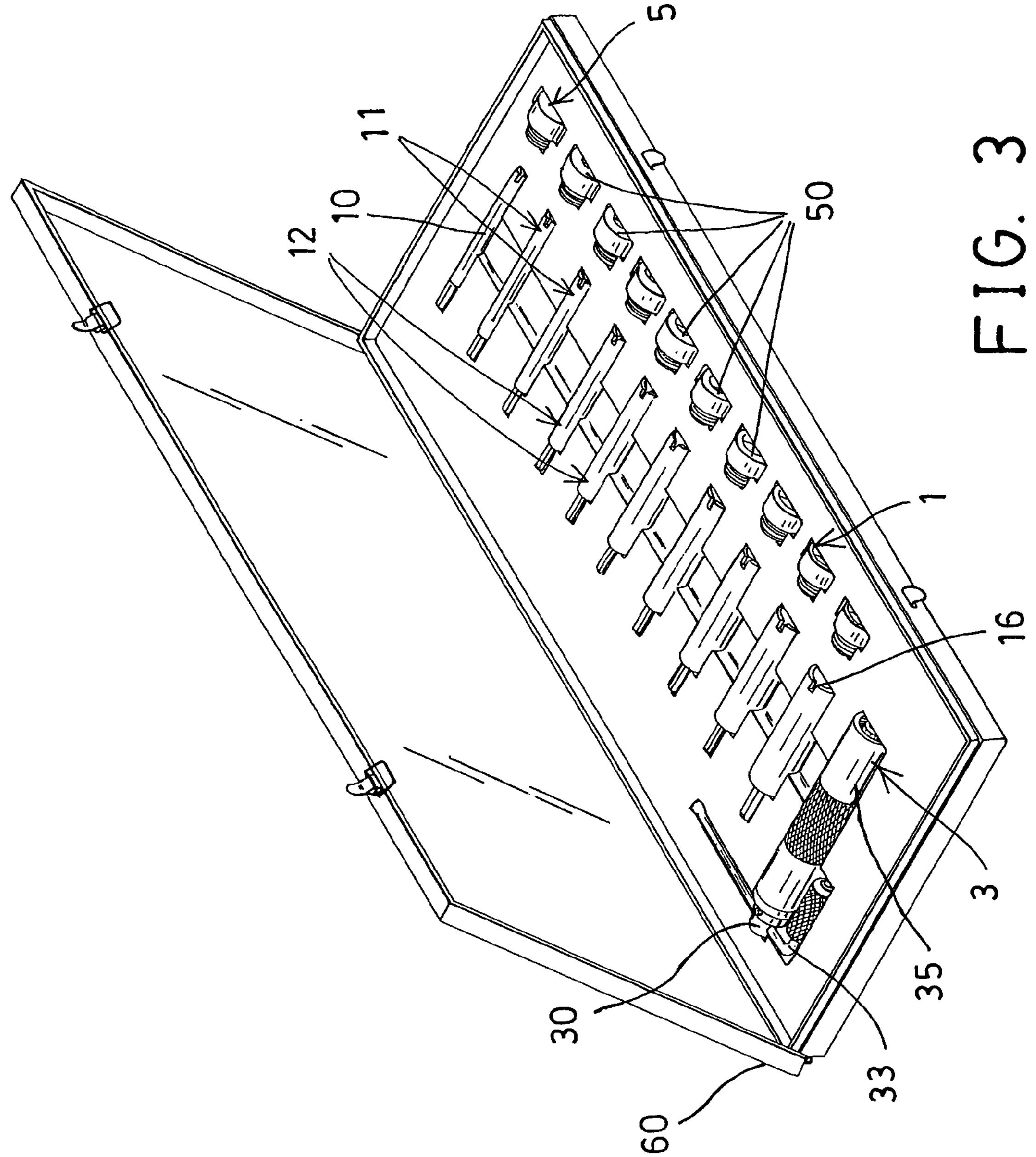
FIG. 3 is a perspective view illustrating a casing or tool box for receiving and storing the installation tool.

Referring to the drawings, and initially to FIGS. 1-3, an installation tool 1 in accordance with the present invention comprises two or more driving shanks 10, 11, 12 having different outer diameters for changeably engaging with different helical coil inserts 20 having different outer or inner diameters and for installing the different helical coil inserts 20 in the tapped holes or damaged screw holes 80 formed in a work piece 8 and for threading or engaging with the other screws or bolts or fasteners 88 (FIG. 1). The driving shanks 10-12 each include a compartment 13 formed in one end portion 14 thereof and formed or defined by a peripheral wall 15, and one or more (such as two opposite) notches 16 formed in the peripheral wall 15 for engaging with a central extension 21 of the helical coil insert 20 and for allowing the helical coil insert 20 to be rotated or driven or forced or installed into the tapped holes or damaged screw holes 80 of the work piece 8.

It is preferable that the driving shanks 10-12 each include a magnet 17 disposed or engaged into the compartment 13 of the driving shank 10-12 for engaging with or for attracting and retaining the helical coil insert 20 to the driving shank 10-12, and each include a non-circular segment 18 formed or provided on the other end portion 19 thereof for engaging with or for coupling to a driving means or device 3. For example, the driving means or device 3 includes a driving mandrel 30 having a non-circular engaging hole 31 formed or provided on one end portion 32 thereof for engaging with the corresponding non-circular segment 18 of the driving shank 10-12 and thus for allowing the driving shank 10-12 and the helical coil insert 20 to be rotated or driven by the driving mandrel 30, and a handle 33 laterally coupled to the other end portion 34 thereof for rotating or driving the driving shank 10-12 and the helical coil insert 20 with an increased driving torque.

Figure 4:
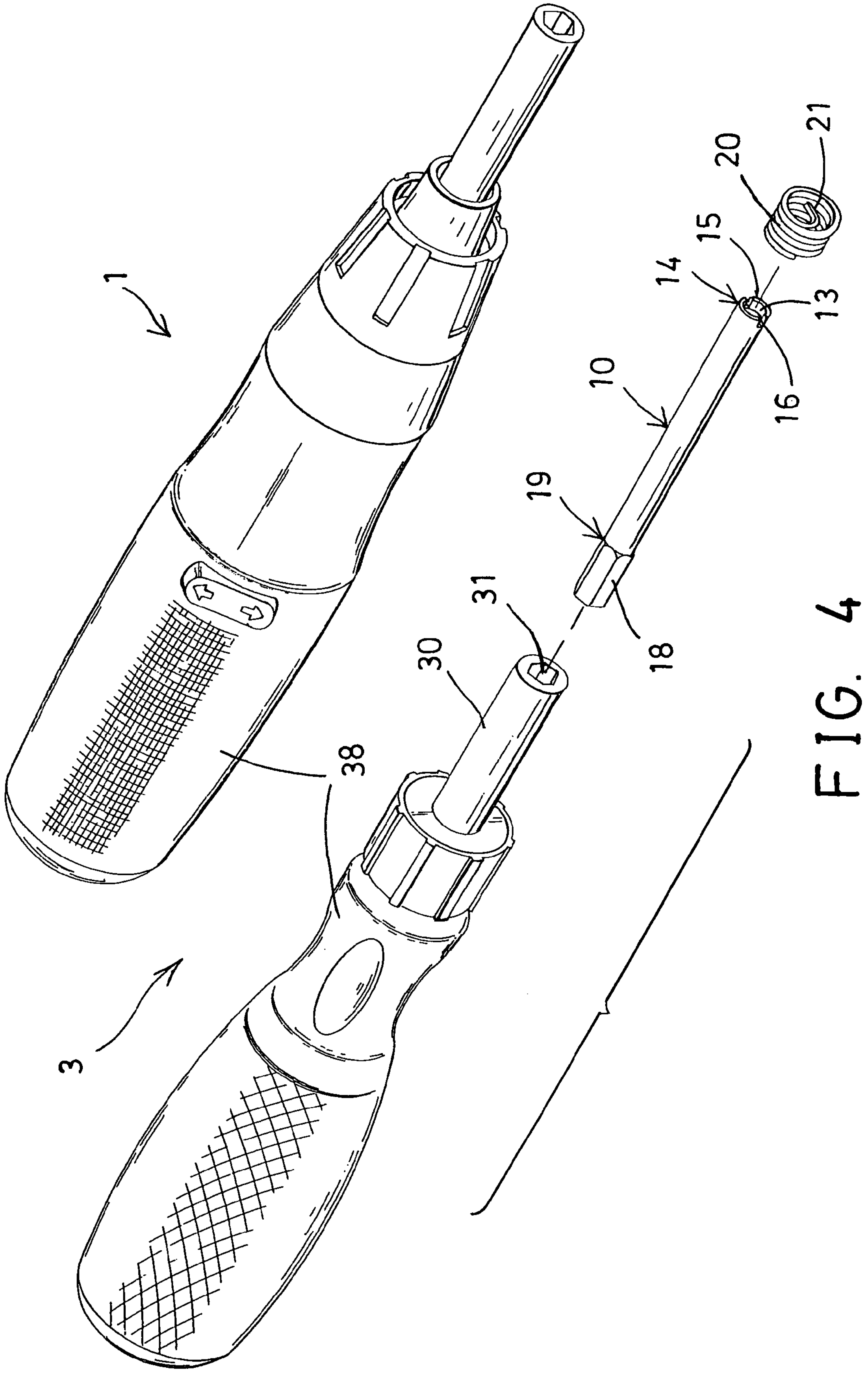
FIG. 4 is a further partial exploded view illustrating the other application of the installation tool.

An outer sleeve 35 may further be provided and rotatably engaged with or onto the driving mandrel 30 with such as bearings (not shown) and for allowing the driving mandrel 30 to be rotated relative to the outer sleeve 35 which is provided for being held or grasped by the users. The driving mandrel 30 may further include a graduation 36 formed or provided on the outer peripheral portion thereof for indicating the relative movement or position between the outer sleeve 35 and the driving mandrel 30 and/or the driving shank 10-12. As shown in FIG. 2, a retaining member 37 may be engaged into the outer sleeve 35 for engaging with the driving mandrel 30 and for retaining the driving mandrel 30 to the outer sleeve 35 and for preventing the driving mandrel 30 from being disengaged or separated from the outer sleeve 35. Alternatively, as shown in FIG. 4, the driving means or device 3 may include a handle 38 attached to the driving mandrel 30 for operating the driving mandrel 30.

As shown in FIG. 2, the outer sleeve 35 includes an inner thread 39 formed in one end portion thereof for threading or engaging with a guiding means or device 5 which includes a number of guiding heads or members 50 each having an outer thread 51 formed thereon for threading or engaging with the inner thread 39 of the outer sleeve 35 and for detachably attaching or securing the guiding members 50 to the outer sleeve 35, the guiding members 50 each include a bore 52 formed therein for slidably and rotatably receiving the driving shank 10-12, and each include an enlarged opening 53 formed in the outer portion thereof for partially receiving the helical coil inserts 20 and for forming a peripheral shoulder 54 between the bore 52 and the enlarged opening 53 and for engaging with or for anchoring the helical coil inserts 20 to the guiding members 50.

It is to be noted that the openings 53 of the guiding members 50 may include different inner diameters for changeably engaging with different helical coil inserts 20 having different outer or inner diameters, and the driving shanks 10-12 of different outer diameters and the guiding members 50 may be changeably attached or coupled to the driving mandrel 30 for allowing the different helical coil inserts 20 to be changeably rotated or driven or forced or installed into the tapped holes or damaged screw holes 80 of the work piece 8. One or more of the guiding members 50 each may further include one or more (such as two opposite) screw holes 55 formed therein for threading or engaging with the other screws or bolts or the other fasteners 56 each having a spring-biased detent or projection 57 attached thereto for such as engaging with the driving shanks 10-12 and/or the helical coil inserts 20 and for anchoring the driving shanks 10-12 and/or the helical coil inserts 20 to the guiding members 50.

In operation, as shown in FIG. 3, a casing or tool box 60 may further be provided for receiving and storing the installation tool 1, in which only one driving means or device 3 is required to be provided and engaged into the tool box 60, and a number of driving shanks 10-12 and a number of guiding members 50 may also be received and stored in the tool box 60 and may be selectively and changeably attached or coupled to the driving mandrel 30 for allowing the different helical coil inserts 20 to be changeably rotated or driven or forced or installed into the tapped holes or damaged screw holes 80 of the work piece 8.

Accordingly, the installation tool in accordance with the present invention includes a number of driving shanks selectively or changeably attached to a driving mandrel for changeably engaging with different helical coil inserts having different outer or inner diameters and for installing the different helical coil inserts in the tapped holes or screw holes formed in the work piece.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An installation tool comprising:

a first helical coil insert including a central extension, at least one second helical coil insert including a central extension and including an outer diameter different from that of said first helical coil insert, a first driving shank including a compartment formed in a first end portion thereof and formed by a peripheral wall, and including at least one notch formed in said peripheral wall for engaging with said central extension of either of said first and said at least one second helical coil inserts and for installing either of said first and said at least one second helical coil inserts into a hole of a work piece, at least one second driving shank including a compartment formed in a first end portion of said at least one second driving shank and formed by a peripheral wall, and including at least one notch formed in said peripheral wall of said at least one second driving shank for engaging with said central extension of either of said first and said at least one second helical coil inserts and for installing either of said first and said at least one second helical coil inserts into the hole of the work piece, means for rotating said first and said at least one second driving shanks to install either of said first and said at least one second helical coil inserts into the hole of the work piece, said rotating means including a driving mandrel having a non-circular engaging hole formed in a first end portion thereof, said first and said at least one second driving shanks each including a non-circular segment provided on a second end portion thereof for engaging with said non-circular engaging hole of said driving mandrel and for allowing said first and said at least one second driving shanks and said first and said at least one second helical coil inserts to be changeably rotated by said driving mandrel, an outer sleeve rotatably engaged with said driving mandrel and provided for being held by a user for allowing said driving mandrel to be rotated relative to said outer sleeve, a first guiding member and at least one second guiding member changeably attached to said outer sleeve and each including a bore formed therein for slidably and rotatably receiving either of said first and said at least one second driving shanks, and said outer sleeve including an inner thread formed therein, and said first and said at least one second guiding members each including an outer thread formed thereon for engaging with said inner thread of said outer sleeve and for detachably attaching either of said first and said at least one second guiding members to said outer sleeve.

2. The installation tool as claimed in claim 1, wherein said first and said at least one second guiding members each include an enlarged opening formed therein for forming a peripheral shoulder between said bore and said enlarged opening thereof and for engaging with said first and said at least one second helical coil inserts to said first and said at least one second guiding members.

3. An installation tool comprising:

a first helical coil insert including a central extension at least one second helical coil insert including a central extension and including an outer diameter different from that of said first helical coil insert, a first driving shank including a compartment formed in a first end portion thereof and formed by a peripheral wall, and including at least one notch formed in said peripheral wall for engaging with said central extension of either of said first and said at least one second helical coil inserts and for installing either of said first and said at least one second helical coil inserts into a hole of a work piece, at least one second driving shank including a compartment formed in a first end portion of said at least one second driving shank and formed by a peripheral wall, and including at least one notch formed in said peripheral wall of said at least one second driving shank for engaging with said central extension of either of said first and said at least one second helical coil inserts and for installing either of said first and said at least one second helical coil inserts into the hole of the work piece, means for rotating said first and said at least one second driving shanks to install either of said first and said at least one second helical coil inserts into the hole of the work piece, said rotating means including a driving mandrel having a non-circular engaging hole formed in a first end portion thereof, said first and said at least one second driving shanks each including a non-circular segment provided on a second end portion thereof for engaging with said non-circular engaging hole of said driving mandrel and for allowing said first and said at least one second driving shanks and said first and said at least one second helical coil inserts to be changeably rotated by said driving mandrel, an outer sleeve rotatably engaged with said driving mandrel and provided for being held by a user for allowing said driving mandrel to be rotated relative to said outer sleeve, and a first guiding member and at least one second guiding member changeably attached to said outer sleeve and each including a bore formed therein for slidably and rotatably receiving either of said first and said at least one second driving shanks, and each including an enlarged opening formed therein for forming a peripheral shoulder between said bore and said enlarged opening thereof and for engaging with said first and said at least one second helical coil inserts to said first and said at least one second guiding members, and said first and said at least one second guiding members each including at least one spring-biased projection attached thereto.

4. The installation tool as claimed in claim 3, wherein said first and said at least one second guiding members each include a screw hole formed therein for engaging with a fastener, and said at least one spring-biased projection is attached to said fastener.

* * * * *